(12) United States Patent
Lee

(10) Patent No.: US 11,157,803 B2
(45) Date of Patent: Oct. 26, 2021

(54) NEUROMORPHIC DEVICE INCLUDING A SYNAPSE HAVING A VARIABLE RESISTOR AND A TRANSISTOR CONNECTED IN PARALLEL WITH EACH OTHER

(71) Applicant: SK hynix Inc., Icheon (KR)

(72) Inventor: Sang-Heon Lee, Icheon (KR)

(73) Assignee: SK hynix Inc, Icheon (KR)

( * ) Notice: Subject to any disclaimer, the term of this patent is extended or adjusted under 35 U.S.C. 154(b) by 1059 days.

(21) Appl. No.: 15/724,084

(22) Filed: Oct. 3, 2017

(65) Prior Publication Data
US 2018/0285721 A1    Oct. 4, 2018

(30) Foreign Application Priority Data

Mar. 31, 2017 (KR) .................. 10-2017-0041682

(51) Int. Cl.
*G06N 3/063* (2006.01)
*G06N 3/04* (2006.01)

(52) U.S. Cl.
CPC ............. *G06N 3/063* (2013.01); *G06N 3/049* (2013.01); *G06N 3/0635* (2013.01)

(58) Field of Classification Search
CPC ..................................................... G06N 3/063
See application file for complete search history.

(56) References Cited

U.S. PATENT DOCUMENTS

| | | | | |
|---|---|---|---|---|
| 5,187,680 | A * | 2/1993 | Engeler | G06N 3/0635 708/801 |
| 5,917,732 | A * | 6/1999 | Kawakami | G06F 17/15 708/201 |
| 6,507,828 | B1 * | 1/2003 | Leonard | G06N 3/063 706/33 |
| 10,650,308 | B2 * | 5/2020 | Ielmini | G06N 3/063 |
| 2011/0063930 | A1 | 3/2011 | Baker | |
| 2012/0150781 | A1 * | 6/2012 | Arthur | G06N 3/049 706/35 |
| 2012/0317063 | A1 * | 12/2012 | Sim | G11C 13/0002 706/27 |
| 2013/0311414 | A1 * | 11/2013 | Nishitani | G06N 3/049 706/25 |
| 2015/0254552 | A1 * | 9/2015 | Park | G06N 3/0635 706/33 |
| 2018/0012123 | A1 * | 1/2018 | Han | G06N 3/049 |

OTHER PUBLICATIONS

Nikonov et al. (Benchmarking of Beyong-CMOS Exploratory Devices for Logic Integrated Circuits, Jul. 2015, pp. 3-11) (Year: 2015).*
Pan et al. (Non-Boolean Computing Benchmarking for Beyond-CMOS Devices Based on Cellular Neural Network, Jan. 2017, pp. 36-43) (Year: 2017).*
Nishitani (Dynamic Observation of Brain-Like Learning in a Ferroelectric Synapse Device, Mar. 2013, pp. 1-6) (Year: 2013).*

* cited by examiner

*Primary Examiner* — George Giroux

(57) ABSTRACT

A neuromorphic device is provided. The neuromorphic device may include a pre-synaptic neuron, a row line extending from the pre-synaptic neuron in a row direction, a post-synaptic neuron, a column line extending from the post-synaptic neuron in a column direction, and a synapse at an intersection region between the row line and the column line. The synapse may include a switching device and a memristor electrically connected with each other in series. The post-synaptic neuron may include a summation circuit, a variable resistor, and a comparator.

15 Claims, 9 Drawing Sheets

NEUROMORPHIC DEVICE INCLUDING A SYNAPSE HAVING A VARIABLE RESISTOR AND A TRANSISTOR CONNECTED IN PARALLEL WITH EACH OTHER

CROSS-REFERENCE TO RELATED APPLICATIONS

The present application claims priority under 35 U.S.C. § 119(a) to Korean Patent Application No. 10-2017-0041682, filed on Mar. 31, 2017, which is incorporated by reference herein in its entirety.

BACKGROUND

1. Field

The present disclosure relates to neuromorphic devices and methods for operating the neuromorphic devices, and more particularly, to neuromorphic devices including a post-synaptic neuron having a feed-back line, and operating methods thereof.

2. Description of the Related Art

Recently, much attention has been paid to devices in the field of neuromorphic technology, which relates to chips that mimic the human brain. A neuromorphic device based on neuromorphic technology includes a plurality of pre-synaptic neurons, a plurality of post-synaptic neurons, and a plurality of synapses. The neuromorphic device outputs pulses or spikes having various levels, amplitudes, and/or times, according to a learning state of the neuromorphic device.

A neuromorphic device generally uses a leaky-integrate-and-fire (LIF) post-synaptic neuron including a capacitor without any feed-back lines. When the capacitor is used in the LIF post-synaptic neuron, as pulses are accumulated in a comparator of the LIF post-synaptic neuron, electric charge is accumulated in the capacitor according to a threshold voltage Vth of the comparator. Accordingly, an operation of the neuromorphic device is inaccurate, a speed of the neuromorphic device is slow, and a power consumption of the neuromorphic device is high.

SUMMARY

Various embodiments of the present disclosure provide neuromorphic devices including post-synaptic neurons having variable resistors.

Various embodiments of the present disclosure provide neuromorphic devices including post-synaptic neurons having feed-back lines configured to initialize variable resistors.

Various embodiments of the present disclosure provide neuromorphic devices including post-synaptic neurons having feed-back lines configured to initialize ferroelectric field effect transistors.

Various embodiments of the present disclosure provide methods for operating neuromorphic devices including post-synaptic neurons having variable resistors.

Various embodiments of the present disclosure provide methods for operating neuromorphic devices including post-synaptic neurons having feed-back lines configured to initialize variable resistors.

Various embodiments of the present disclosure provide methods for operating neuromorphic devices including post-synaptic neurons having ferroelectric field effect transistors.

Various embodiments of the present disclosure provide methods for operating neuromorphic devices including post-synaptic neurons having feed-back lines configured to initialize ferroelectric field effect transistors.

In an embodiment of the present disclosure, a neuromorphic device may include a pre-synaptic neuron, a row line extending from the pre-synaptic neuron in a row direction, a post-synaptic neuron, a column line extending from the post-synaptic neuron in a column direction, and a synapse at an intersection region between the row line and the column line.

The synapse may include a switching device and a memristor electrically connected with each other in series.

The post-synaptic neuron may include a summation circuit, a variable resistor, and a comparator.

The post-synaptic neuron may further include a first feed-back line electrically connecting an output terminal of the comparator to the variable resistor.

The post-synaptic neuron may further include an inverter on the first feed-back line.

The post-synaptic neuron may further include a second feed-back line electrically connecting the output terminal of the comparator to the switching device.

The post-synaptic neuron may further include an inverter on the second feed-back line.

The post-synaptic neuron may further include a pulse generator electrically connected with an output terminal of the comparator.

The post-synaptic neuron may further include a first feed-back line electrically connecting an output terminal of the pulse generator to the variable resistor.

The post-synaptic neuron may further include a second feed-back line electrically connecting the output terminal of the pulse generator to the switching device.

The switching device may include a transistor. A gate electrode of the transistor may be electrically connected with an output terminal of the comparator.

The summation circuit may include at least one of an adding circuit and an integrating circuit.

The variable resistor may include at least one of a resistive device, a phase changeable device, a magneto-resistive device, a conductive bridging device, and a ferroelectric field effect transistor (FeFET).

The variable resistor may include a ferroelectric field effect transistor (FeFET). The column line may be electrically connected with an input terminal of the summation circuit, and an output terminal of the summation circuit may be electrically connected with a gate electrode of the FeFET.

A source electrode of the FeFET may be electrically connected with a power source, and a drain electrode of the FeFET may be electrically connected with an input terminal of the comparator.

The post-synaptic neuron may further include a first feed-back line electrically connecting an output terminal of the comparator to a body of the FeFET.

The post-synaptic neuron may further include a pulse generator electrically connected with an output terminal of the comparator. An output terminal of the pulse generator may be electrically connected with a first feed-back line. The first feed-back line may be electrically connected to a body of the FeFET.

In an embodiment of the present disclosure, a method for operating a neuromorphic device may include providing a row signal from a pre-synaptic neuron to a synapse through a row line, generating a column signal in the synapse using the row signal, providing the column signal from the synapse to a post-synaptic neuron through a column line, the post-synaptic neuron including a summation circuit electrically connected with the column line, a variable resistor having a first electrode electrically connected with an output terminal of the summation circuit, and a comparator having an input terminal electrically connected with a second electrode of the variable resistor, and providing a first portion of an output signal of the comparator to the variable resistor.

The method may further include providing a second portion of the output signal of the comparator to a switching device, the synapse including the switching device and a memristor.

The switching device may further include a transistor. The second portion of the output signal of the comparator may be provided to a gate electrode of the transistor.

The method may further include providing the first portion of the output signal of the comparator to a second electrode of the variable resistor.

The post-synaptic neuron may further include a pulse generator having an input terminal electrically connected with an output terminal of the comparator.

DETAILED DESCRIPTION

Figure 1:
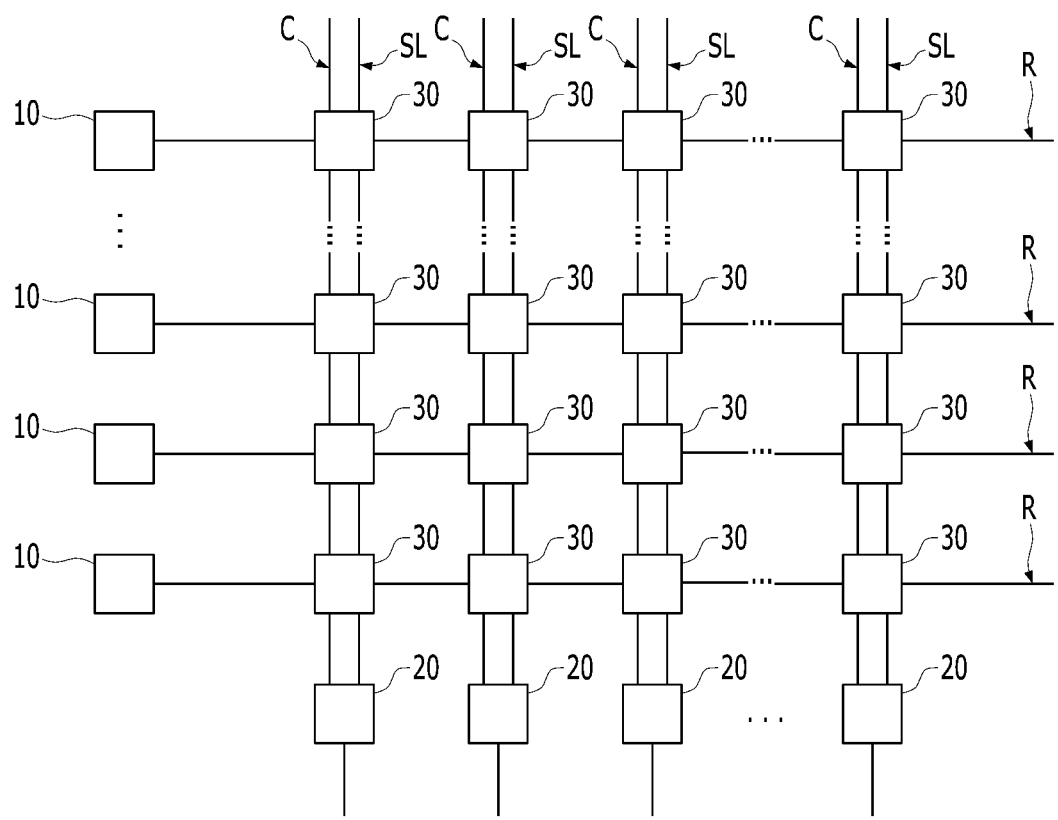
FIG. 1 is a diagram schematically illustrating a synapse array of a neuromorphic device in accordance with an embodiment of the present disclosure.

Various embodiments will be described below in more detail with reference to the accompanying drawings. Embodiments of the present disclosure may, however, have different forms and should not be construed as limited to the embodiments set forth herein. Rather, these embodiments are provided so that this disclosure will be thorough and complete, and will fully convey the scope of the claims to those skilled in the art.

Throughout the specification, like reference numerals refer to the same elements. Therefore, although the same or similar reference numerals are not mentioned or described in the corresponding drawing, the reference numerals may be described with reference to other drawings. Furthermore, although elements are not represented by reference numerals, the elements may be described with reference to other drawings.

FIG. 1 is a diagram schematically illustrating a synapse array of a neuromorphic device in accordance with an embodiment of the present disclosure.

Referring to FIG. 1, the synapse array of the neuromorphic device in accordance with the present disclosure may include a plurality of pre-synaptic neurons 10, a plurality of post-synaptic neurons 20, a plurality of synapses 30, a plurality of row lines R, a plurality of column lines C, and a plurality of selecting lines SL. Each of the plurality of row lines R may extend in a row direction, and may electrically connect one of the plurality of pre-synaptic neurons 10 to one of the plurality of synapses 30. Each of the plurality of column lines C and the plurality of selecting lines SL may extend in a column direction, and may connect one of the plurality of post-synaptic neurons 20 to one of the plurality of synapses 30.

The synapses 30 may be disposed at intersection regions between the row lines R and the column lines C. The intersection regions may be regions where the row lines R and the column lines C intersect in a direction crossing the row direction and the column direction. The selecting lines SL may be in parallel with the column lines C. That is, the synapses 30 sharing the same column line C may also share the same selecting line SL. Each of the synapses 30 may be electrically connected with one of the pre-synaptic neurons 10 through one of the row lines 10, and electrically connected with one of the post-synaptic neurons 20 through one of the column lines C and one of the selecting lines SL.

The pre-synaptic neurons 10 may transmit electrical signals to the synapses 30 through the row lines R in any of a learning mode, a reset mode, and a read-out mode. The post-synaptic neurons 20 may transmit electrical signals to the synapses 30 through the column lines C and the selecting lines SL in any of the learning mode and the reset mode; and may receive electrical signals from the synapses 30 through the column lines C and transmit electrical signals to the synapses 30 through the selecting lines SL, in the read-out mode. The synapses 30 will be described more specifically hereafter.

Figure 2A:
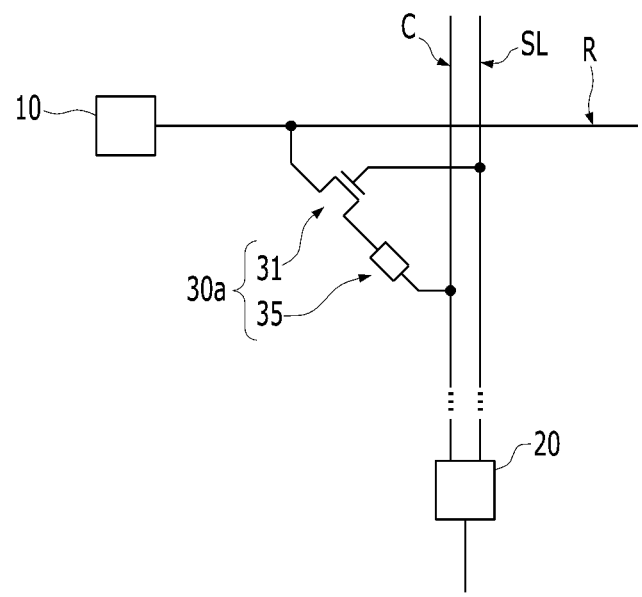
FIGS. 2A and 2B are diagrams schematically illustrating synapses of synapse arrays of neuromorphic devices in accordance with various embodiments of the present disclosure.
Figure 2B:
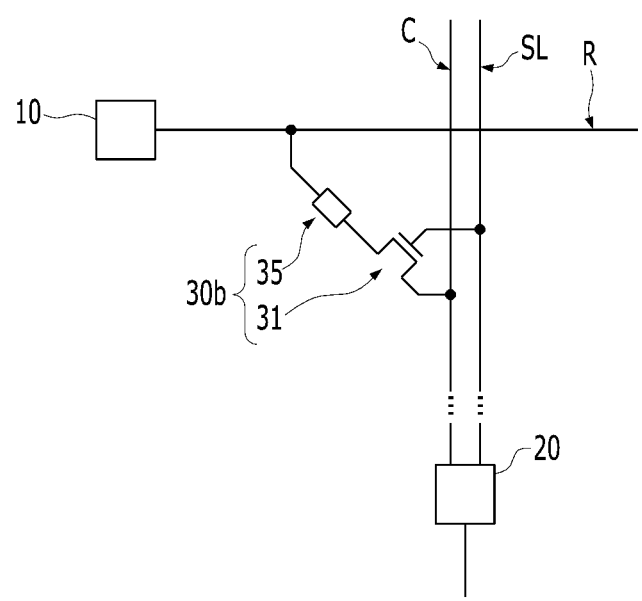

FIGS. 2A and 2B are diagrams schematically illustrating synapses of synapse arrays of neuromorphic devices in accordance with various embodiments of the present disclosure.

Referring to FIG. 2A, a synapse 30a in accordance with an embodiment of the present disclosure may include a switching device 31 and a memristor 35, which are electrically connected with each other in series. The switching device 31 may include a 3-terminal selector such as a metal oxide semiconductor (MOS) transistor or a 2-terminal selector such as a diode. For example, in an embodiment shown in FIG. 2A, the synapse 30a may include a switching transistor, as the switching device 31, electrically connected with the memristor 35 in series. When the switching device 31 is a switching transistor, a gate electrode of the switching transistor may be electrically connected with the post-synaptic neuron 20 through the selecting line SL, a drain electrode of the switching transistor may be electrically connected with the pre-synaptic neuron 10 through the row line R, and a source electrode of the switching transistor may be electrically connected with a first electrode of the memristor 35. A second electrode of the memristor 35 may electrically connected with the post-synaptic neuron 20 through the column line C.

Referring to FIG. 2B, a synapse 30b in accordance with an embodiment of the present disclosure may include a memristor 35 and a switching device 31 electrically connected with each other in series. The switching device 31 may be, e.g., a switching transistor. When the switching device 31 is a switching transistor, a first electrode of the memristor 35 may be electrically connected with the pre-synaptic neuron 10 through the row line R, a second electrode of the memristor 35 may be electrically connected with a drain electrode of the switching transistor, a source electrode of the switching transistor may be electrically connected with the post-synaptic neuron 20 through the column line C, and a gate electrode of the switching transistor may be electrically connected with the post-synaptic neuron 20 through the selecting line SL.

Referring to the embodiments illustrated in FIGS. 1, 2A, and 2B, a row signal may be provided from the pre-synaptic neuron 10 to the synapse 30a or 30b through the row line R. When the switching device 31 of the synapses 30a or 30b is turned on, the row signal may be provided to the memristor 35. The row signal can control a resistance state of the memristor 35 by training the memristor 35 in any of a learning mode, an initializing mode, a potentiating mode, a set mode, a depressing mode, and a reset mode, or the row signal may be converted into a current value depending on the resistance state of the memristor 35. In other words, the resistance state of the memristor 35 may be changed by the row signal, or a current value depending on the resistance state of the memristor 35 may be output to the column line C by the row signal. That is, when the switching device 31 of the synapses 30a or 30b is turned on, a synapse weight may be provided and output to the column line C.

FIGS. 3A to 3F are diagrams schematically illustrating post-synaptic neurons 20 in accordance with various embodiments of the present disclosure.

Figure 3A:
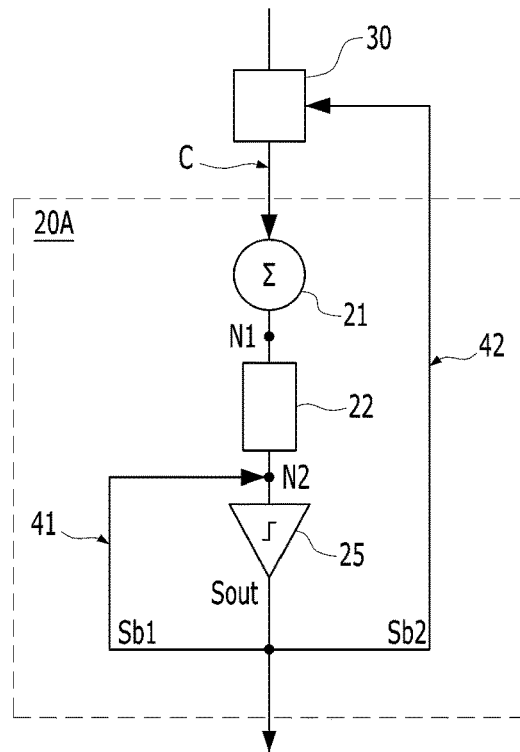
FIGS. 3A to 3F are diagrams schematically illustrating post-synaptic neurons in accordance with various embodiments of the present disclosure.

Referring to FIG. 3A, a post-synaptic neuron 20A in accordance with an embodiment of the present disclosure may include a summation circuit 21, a variable resistor 22, and a comparator 25, which are electrically connected with each other in series. An output node of a synapse 30, e.g., a column line C, may be electrically connected with an input terminal of the summation circuit 21. An output terminal of the summation circuit 21 may be electrically connected with a first electrode of the variable resistor 22 through a first node N1. A second electrode of the variable resistor 22 may be electrically connected with an input terminal of the comparator 25 through a second node N2.

The post-synaptic neuron 20A may further include a first feed-back line 41, which electrically connects an output terminal of the comparator 25 to the variable resistor 22, and a second feed-back line 42, which electrically connects the output terminal of the comparator 25 to the synapse 30. The first feed-back line 41 may be electrically connected with the second node N2, and the second feed-back line 42 may be electrically connected with a selecting line SL. In an embodiment, the second feed-back line 42 may be a portion of the selecting line SL.

The summation circuit 21 may sum synapse weights of a plurality of synapses 30 on the same column line C, and may provide the summation of the synapse weights to the variable resistor 22. For example, the summation circuit 21 may include any of an adding circuit and an integrating circuit.

The variable resistor 22 may include at least one of a resistive device (e.g., a resistive random access memory (ReRAM)), a phase changeable device (e.g., a phase changeable random access memory (PCRAM)), a magneto-resistive device (e.g., a magneto-resistive random access memory (MRAM)), a conductive bridging device (e.g., a conductive bridging random access memory (CBRAM)), or another variable resistive device. Accordingly, a resistance value or a conductance of the variable resistor 22 may be changed depending on outputs of the summation circuit 21 and/or the comparator 25.

For example, the resistance value of the variable resistor 22 may be decreased according to the output of the summation circuit 21 in a set operation, and may be increased according to the output of the comparator 25 in a reset operation. For example, when a synapse current summed by the summation circuit 21 is relatively low, the variable resistor 22 may have a relatively high resistance level. Accordingly, a relatively low current and a relatively low synapse weight may be provided to the comparator 25. In contrast, when the synapse current summed by the summation circuit 21 is relatively high, the variable resistor 22 may have a relatively low resistance level. Accordingly, a relatively high current and a relatively high synapse weight may be provided to the comparator 25.

When the output of the variable resistor 22 is higher than a reference voltage of the comparator 25, the comparator 25 may output electrical signals. That is, the comparator 25 of the post-synapse neuron 20A may be fired. The electrical signals outputted by the fired comparator 25 may be output signals Sout. Portions of the output signals Sout may divaricate as first feed-back signals Sb1 and second feed-back signals Sb2. The output signals Sout of the comparator 25 may also be provided to pre-synaptic neurons or synapses of a next synapse array.

The first feed-back signals Sb1 divaricated from the output signals Sout of the comparator 25 may be provided to the second electrode of the variable resistor 22 through the first feed-back line 41 and the second node N2, and may initialize the variable resistor 22. When the variable resistor 22 is initialized, the resistance value of the variable resistor 22 may become the maximum level or the minimum level. When the synapse 30 includes a switching transistor and a memristor as illustrated in FIG. 2A or 2B, the output terminal of the comparator 25 may be electrically connected with a gate electrode of the switching transistor of the synapse 30 through the second feed-back line 42 and/or the selecting line SL. Accordingly, the second feed-back signals Sb2 divaricated from the output signals Sout of the comparator 25 may be provided to the gate electrode of the switching transistor and may set or reset the memristor of the synapse 30. For example, the second feed-back signals Sb2 may be used as electrical signals for initiating a spike-timing-dependent-plasticity (STDP) operation, which changes the synapse weight of the synapse 30.

Figure 3B:
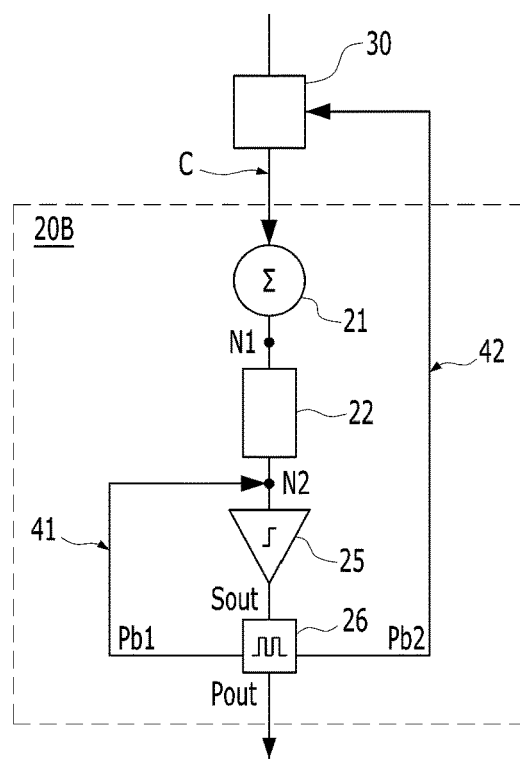

Referring to FIG. 3B, a post-synaptic neuron 20B in accordance with an embodiment of the present disclosure may include the summation circuit 21, the variable resistor 22, the comparator 25, and a pulse generator 26. The output terminal of the comparator 25 may be electrically connected with an input terminal of the pulse generator 26. The post-synaptic neuron 20B may include the first feed-back line 41, which electrically connects an output terminal of the pulse generator 26 to the variable resistor 22, and the second feed-back line 42, which electrically connects the output terminal of the pulse generator 26 to the synapse 30. The first feed-back line 41 may be electrically connected with the second node N2, and the second feed-back line 42 may be electrically connected with the selecting line SL (not illustrated). In an embodiment, the second feed-back line 42 may be a portion of the selecting line SL.

The pulse generator 26 may receive the output signals Sout from the fired comparator 25, and may generate output pulses Pout, first feed-back pulses Pb1, and second feed-back pulses Pb2. The output pulses Pout generated from the pulse generator 26 may be provided to pre-synaptic neurons or synapses of a next synapse array.

The first feed-back pulses Pb1 generated from pulse generator 26 may be provided to the second electrode of the variable resistor 22, i.e., the second node N2, and may initialize the variable resistor 22.

The second feed-back pulses Pb2 generated from the pulse generator 26 may be provided to the synapse 30 and may set or reset the synapse 30. The second feed-back pulses Pb2 generated from the pulse generator 26 may be provided to the gate electrode of the switching transistor of the synapse 30 and may set or reset the memristor. For example, the second feed-back pulses Pb2 may be provided to the gate electrode of the switching transistor of the synapse 30 and may change the resistance state of the memristor. That is, the second feed-back pulses Pb2 may be used as electrical signals for initiating an STDP operation, which changes the synapse weight of the synapse 30.

Figure 3C:
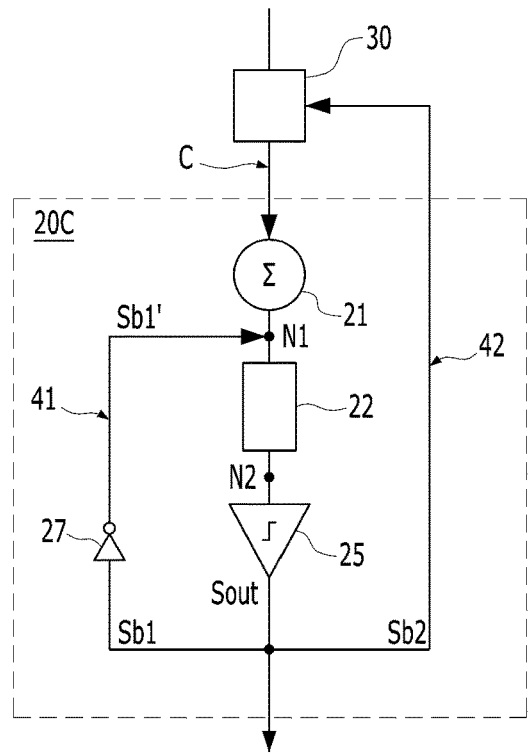

Referring to FIG. 3C, a post-synaptic neuron 20C in accordance with an embodiment of the present disclosure may include the summation circuit 21, the variable resistor 22, the comparator 25, and an inverter 27. The first feed-back line 41 may be electrically connected with the first node N1. The inverter 27 may receive the first feed-back signals Sb1 from the fired comparator 25, and may generate first inverted feed-back signals Sb1' by amplifying and inverting the first feed-back signals Sb1. Further, referring to FIG. 3C, the first inverted feed-back signals Sb1' generated by the inverter 27 may be provided to the first electrode of the variable resistor 22, i.e., the first node N1, and may initialize the variable resistor 22.

Figure 3D:
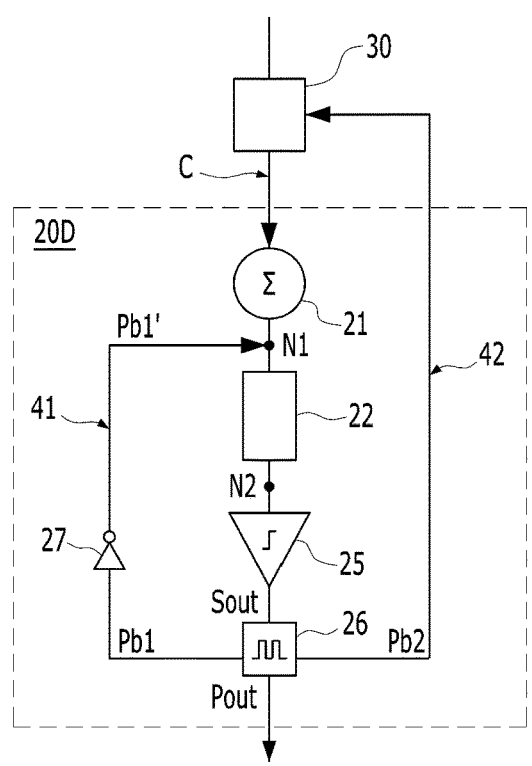

Referring to FIG. 3D, a post-synaptic neuron 20D may include the summation circuit 21, the variable resistor 22, the comparator 25, the pulse generator 26, and the inverter 27. The first feed-back line 41 may be electrically connected with the first node N1. The pulse generator 26 may receive the output signals Sout from the fired comparator 25, and may generate the output pulses Pout, the first feed-back pulses Pb1, and the second feed-back pulses Pb2. The inverter 27 may receive the first feed-back pulses Pb1 from the pulse generator 26, and may generate the first inverted feed-back pulses Pb1' by amplifying and inverting the first feed-back pulses Pb1. The first inverted feed-back pulses Pb1' may be provided to the first electrode of the variable resistor 22, i.e., the first node N1, and may initialize the variable resistor 22. Furthermore, the second feed-back pulses Pb2 generated from the pulse generator 26 may be provided to the synapse 30, which may set or reset the synapse 30.

Figure 3E:
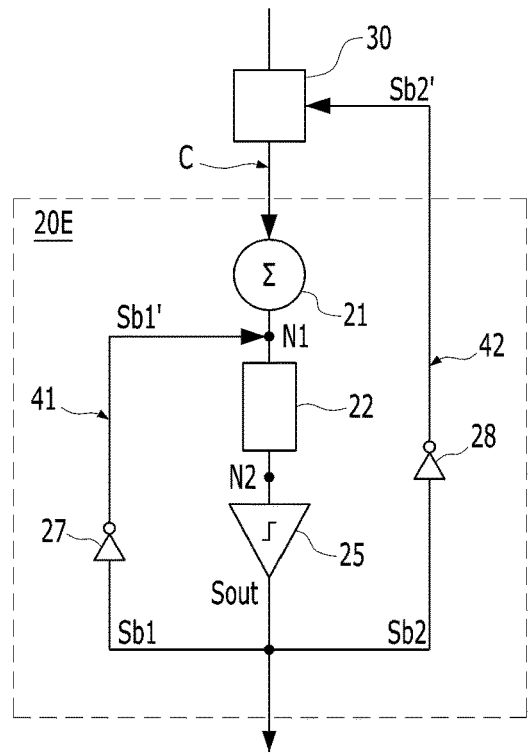

Referring to FIG. 3E, a post-synaptic neuron 20E may include the summation circuit 21, the variable resistor 22, the comparator 25, a first inverter 27, and a second inverter 28. The first feed-back line 41 may be electrically connected with the first node N1. The second inverter 28 may receive the second feed-back signals Sb2 from the fired comparator 25, and generate second inverted feed-back signals Sb2' by amplifying and inverting the second feed-back signals Sb2. The second inverted feed-back signals Sb2' may be provided to the synapse 30 to initialize the synapse 30. The inverted second feed-back signals Sb2' may be used as electrical signals for initiating an STDP operation, which changes the synapse weight of the synapse 30.

Figure 3F:
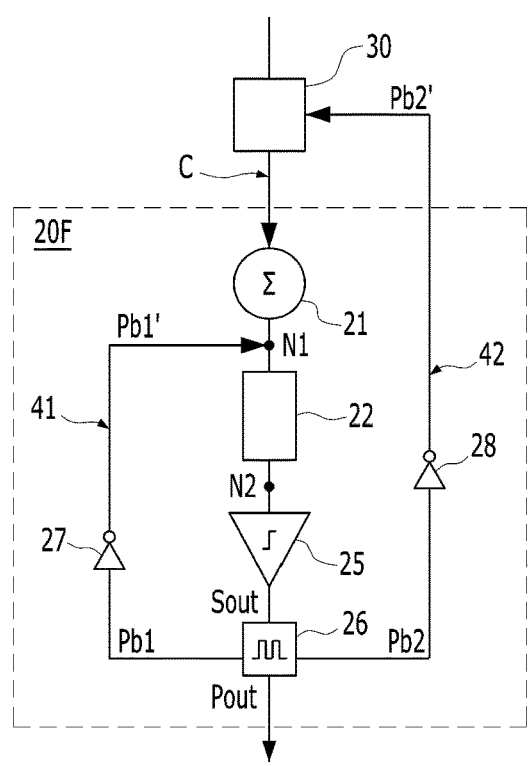

Referring to FIG. 3F, a post-synaptic neuron 20F in accordance with an embodiment of the present disclosure may include the summation circuit 21, the variable resistor 22, the comparator 25, the pulse generator 26, the first inverter 27, and the second inverter 28. The first feed-back line 41 may be electrically connected with the first node N1. The inverter 27 may provide the first inverted feed-back pulses Pb1' inverted from the first feed-back pulses Pb1 of the pulse generator 26 to the first electrode of the variable resistor 22, i.e., the first node N1, in order to initialize the variable resistor 22. The second inverter 28 may provide the second inverted feed-back pulses Pb2' inverted from the second feed-back pulses Pb2 of the pulse generator 26 to the synapse 30 in order to initialize the synapse weight of the synapse 30.

As shown in FIGS. 3A to 3F, reset signals (e.g., the first feed-back signals Sb1, the first inverted feed-back signals Sb1', the first feed-back pulses Pb1, or the first inverted feed-back pulses Pb1') that reset the variable resistor 22 may be provided to one of the two electrodes of the variable resistor 22. That is, the reset signals may be provided to one of the first node N1 between the summation circuit 21 and the variable resistor 22, and the second node N2 between the variable resistor 22 and the comparator 25. The variable resistor 22 may be a 2-terminal device having the first electrode and the second electrode, and set or reset characteristics of the synapse 30 may be changed according to the arrangement directions of the two electrodes. That is, according to an arrangement of the variable resistor 22, circuits of the post-synaptic neuron 20 may provide the signals (e.g., the first feed-back signals Sb1, the first inverted feed-back signals Sb1', the first feed-back pulses Pb1, or the first inverted feed-back pulses Pb1') to initialize the variable resistor 22 to one of the first electrode and the second electrode of the variable resistor 22.

FIGS. 4A to 4F are diagrams schematically illustrating post-synaptic neurons 20G to 20L in accordance with various embodiments of the present disclosure.

Figure 4A:
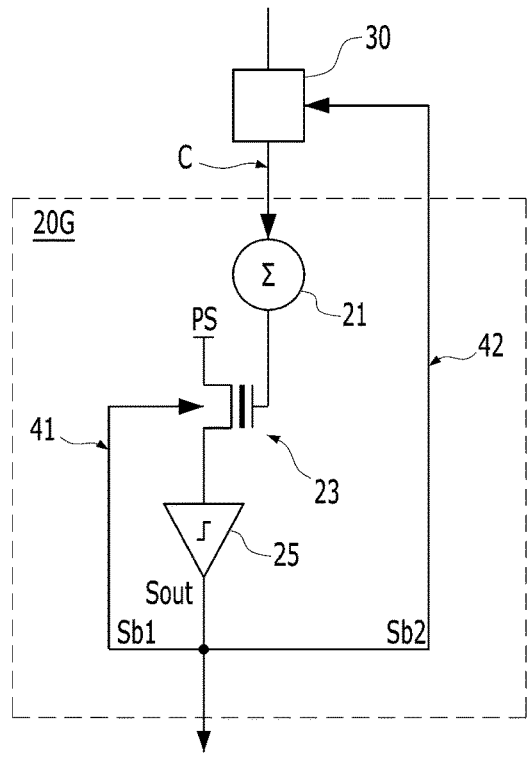
FIGS. 4A to 4F are diagrams schematically illustrating post-synaptic neurons in accordance with various embodiments of the present disclosure.

Referring to FIG. 4A, a post-synaptic neuron 20G in accordance with an embodiment of the present disclosure may include the summation circuit 21, a ferroelectric field effect transistor (FeFET) 23, and the comparator 25. The output terminal of the summation circuit 21 may be electrically connected with a gate electrode of the FeFET 23. A source electrode of the FeFET 23 may be electrically connected with a power source PS. Accordingly, the power source PS may provide be current or voltage to the source electrode of the FeFET 23. A drain electrode of the FeFET 23 may be electrically connected with the input terminal of the comparator 25. The post-synaptic neuron 20G may further include the first feed-back line 41, which may electrically connect the output terminal of the comparator 25 to a body of the FeFET 23, and the second feed-back line 42, which may electrically connect the output terminal of the comparator 25 to the selecting line SL or to the synapse 30. In an embodiment, the selecting line SL may include the second feed-back line 42 connected to the synapse 30.

The output signals of the summation circuit 21 may control a polarization voltage Vp of the gate electrode of the FeFET 23. That is, as the output signals of the summation circuit 21 input to the gate electrode of the FeFET 23 accumulate, the polarization voltage Vp of the gate electrode of the FeFET 23 may be changed. When the polarization voltage Vp of the gate electrode of the FeFET 23 is changed, a threshold voltage Vth of the FeFET 23 may be adjusted so that a channel size of the FeFET 23 can be controlled. Accordingly, depending on the output signals of the summation circuit 21, the channel size and a current transfer capability of the FeFET 23 can be controlled. Specifically, as the output signals of the summation circuit 21 increase, the polarization voltage Vp of the FeFET 23 can increase, so that a current may be provided from the power source PS to the comparator 25. The output signals of the summation circuit 21 can turn the FeFET 23 on and off.

When the current (or a voltage) provided from the power source PS to the comparator 25 through the FeFET 23 is higher than a reference current (or a reference voltage), the comparator 25 may output electrical signals, for example, output signals Sout. That is, the comparator 25 can be fired.

A first portion of the output signals Sout of the fired comparator 25 may divaricate into the first feed-back signals Sb1, which may reset the FeFET 23. The first feed-back signals Sb1 may be provided to the body of the FeFET 23 so that the polarization voltage Vp of the gate electrode of the FeFET 23 may be reset. A second portion of the output signals Sout of the comparator 25 may divaricate into the second feed-back signals Sb2, which may set or reset the synapse 30. The output signals Sout of the comparator 25 may be provided to a pre-synaptic neuron or a synapse of a next synapse array. For example, the second feed-back signals Sb2 may be used as electrical signals for initiating an STDP operation, which changes the synapse weight of the synapse 30.

Figure 4B:
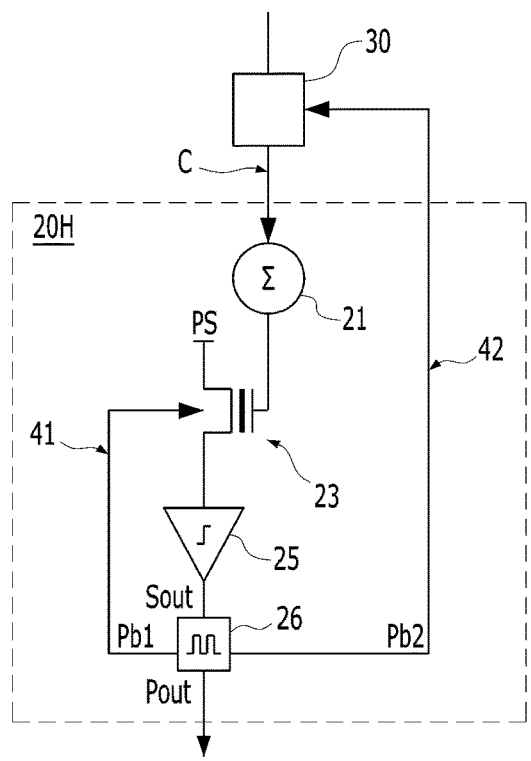

Referring to FIG. 4B, a post-synaptic neuron 20H in accordance with an embodiment of the present disclosure may include the summation circuit 21, the FeFET 23, the comparator 25, and the pulse generator 26. The post-synaptic neuron 20H may further include the first feed-back line 41 and the second feed-back line 42. The first feed-back line 41 may electrically connect the output terminal of the pulse generator 26 to the body of the FeFET 23. The second feed-back line 42 may electrically connect the output terminal of the pulse generator 26 to the selecting line SL or to the synapse 30. In an embodiment, the selecting line SL may include the second feed-back line 42 connected to the synapse 30.

The pulse generator 26 may receive the output signals Sout from the fired comparator 25, and may generate the output pulses Pout, the first feed-back pulses Pb1, and the second feed-back pulses Pb2. The output pulses Pout generated from the pulse generator 26 may be provided to a pre-synaptic neuron or a synapse of a next synapse array. The first feed-back pulses Pb1 generated from the pulse generator 26 may be provided to the body of the FeFET 23, and may reset the polarization voltage Vp of the FeFET 23. Furthermore, the second feed-back pulses Pb2 generated from the pulse generator 26 may be provided to the synapse 30, and may set or reset the synapse 30. For example, the second feed-back pulses Pb2 generated from the pulse generator 26 may be used as electrical signals for initiating an STDP operation, which changes the synapse weight of the synapse 30.

Figure 4C:
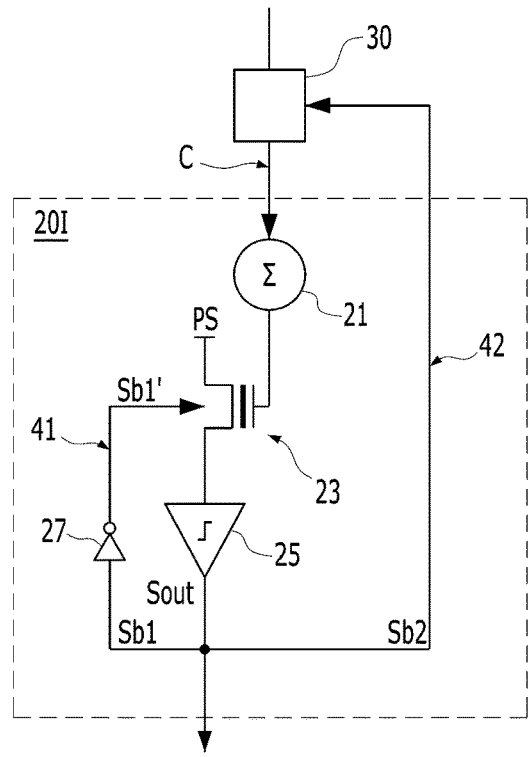

Referring to FIG. 4C, a post-synaptic neuron 20I in accordance with an embodiment of the present disclosure may include the summation circuit 21, the FeFET 23, the comparator 25, and the inverter 27. The inverter 27 may generate the first inverted feed-back signals Sb1' by receiving, amplifying, and inverting the first feed-back signals Sb1 from the fired comparator 25. The inverter 27 may provide the first inverted feed-back signals Sb1' to the body of the FeFET 23, which may reset the polarization voltage Vp of the gate electrode of the FeFET 23.

Figure 4D:
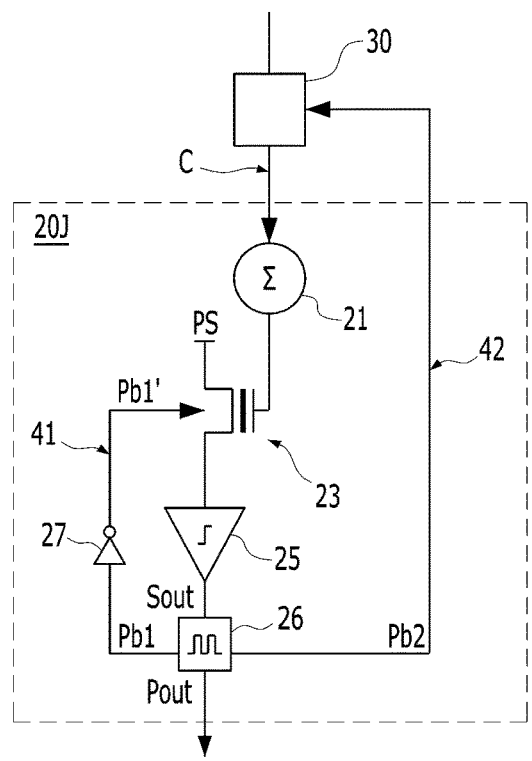

Referring to FIG. 4D, a post-synaptic neuron 20J in accordance with an embodiment of the present disclosure may include the summation circuit 21, the FeFET 23, the comparator 25, the pulse generator 26, and the inverter 27. The inverter 27 may generate the first inverted feed-back pulses Pb1' by receiving, amplifying, and inverting the first feed-back pulses Pb1 from the pulse generator 26. The inverter 27 may provide the first inverted feed-back pulses Pb1' to the FeFET 23, which may reset the polarization voltage Vp of the gate electrode of the FeFET 23.

Figure 4E:
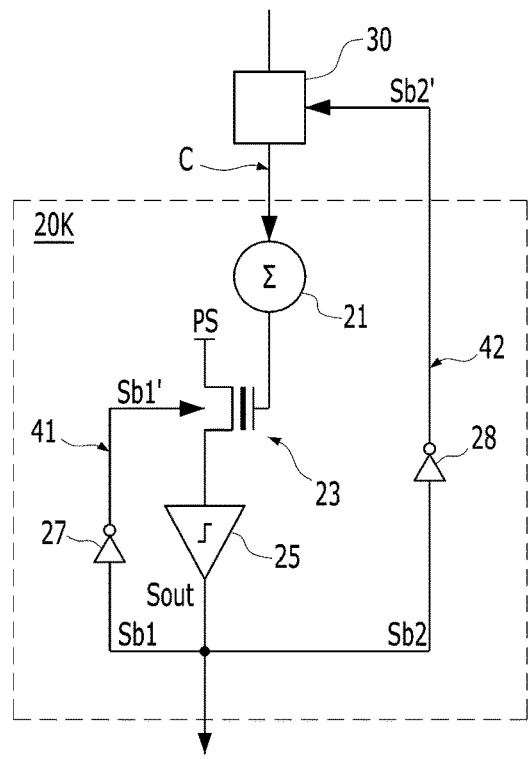

Referring to FIG. 4E, a post-synaptic neuron 20K in accordance with an embodiment of the present disclosure may include the summation circuit 21, the FeFET 23, the comparator 25, the first inverter 27, and the second inverter 28. The second inverter 28 may generate the second inverted feed-back signals Sb2' by receiving, amplifying, and inverting the second feed-back signals Sb2 from the fired comparator 25. The second inverter 28 may provide the second inverted feed-back signals Sb2' to the synapse 30, which may set or reset the synapse 30. That is, the second inverted feed-back signals Sb2' may be used as electrical signals for initiating an STDP operation, which changes the synapse weight of the synapse 30.

Figure 4F:
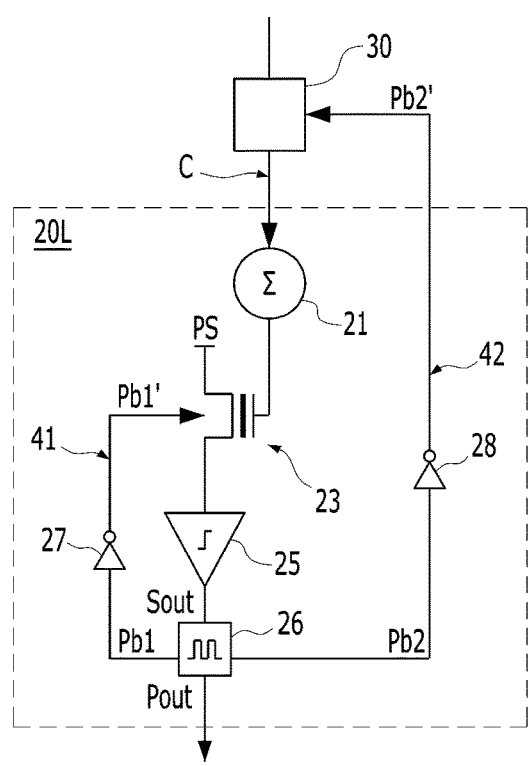

Referring to FIG. 4F, a post-synaptic neuron 20L in accordance with an embodiment of the present disclosure may include the summation circuit 21, the FeFET 23, the comparator 25, the pulse generator 26, the first inverter 27, and the second inverter 28. The first inverter 27 may generate the first feed-back pulses Pb1' by receiving, amplifying, and inverting the first feed-back pulses Pb1. The first inverter 27 may provide the first feed-back pulses Pb1' to the body of the FeFET 23, which may reset the polarization voltage Vp of the gate electrode of the FeFET 23. The second inverter 28 may generate the second inverted feed-back pulses Pb2' by receiving, amplifying, and inverting the second feed-back pulses Pb2. The second inverter 28 may provide the second inverted feed-back pulses Pb2' to the synapse 30, which may set or reset the synapse 30.

Figure 5:
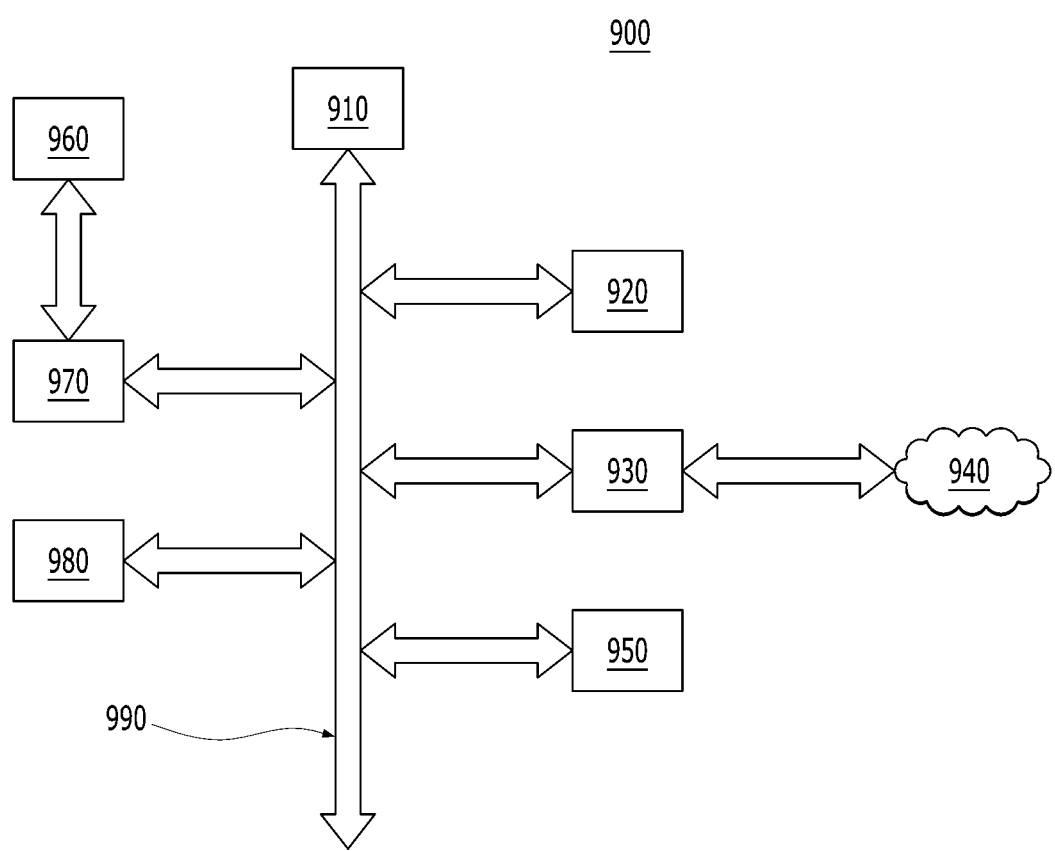
FIG. 5 is a diagram schematically illustrating a pattern recognizing system including neuromorphic devices in accordance with various embodiments of present disclosure.

FIG. 5 is a diagram schematically illustrating a pattern recognition system 900 including neuromorphic devices in accordance with various embodiments of the present disclosure. For example, the pattern recognition system 900 may include a speech recognition system, an imaging recognition system, a code recognition system, a signal recognition system, and one or more systems for recognizing various patterns.

Referring to FIG. 5, the pattern recognition system 900 in accordance with the embodiment of the present disclosure may include a Central Processing Unit (CPU) 910, a memory unit 920, a communication control unit 930, a network 940, an output unit 950, an input unit 960, an Analog-Digital Converter (ADC) 970, a neuromorphic unit 980, and a bus 990. The CPU 910 may generate and transmit various signals for a learning process of the neuromorphic unit 980, and perform various processes and functions for recognizing patterns according to an output from the neuromorphic unit 980. For example, the CPU 910 may perform processes and functions for recognizing speech and imaging patterns based on an output from the neuromorphic unit 980.

The CPU 910 may be connected with the memory unit 920, the communication control unit 930, the output unit 950, the ADC 970, and the neuromorphic unit 980 through the bus 990.

The memory unit 920 may store various pieces of information, which are required to be stored in the pattern recognition system 900. The memory unit 920 may include one or more of a volatile memory device, such as DRAM or SRAM, a nonvolatile memory, such as PRAM, MRAM, ReRAM, or NAND flash memory, and various memory units, such as Hard Disk Drive (HDD) and Solid State Drive (SSD).

The communication control unit 930 may transmit and/or receive data to and/or from a communication control unit of another system through the network 940. For example, the communication control unit 930 may transmit speech and/or image recognition data through the network 940.

The output unit 950 may output data in various manners. For example, the output unit 950 may include a speaker, a printer, a monitor, a display panel, a beam projector, a hologrammer, or other various output devices. The output unit 950 may output, for example, speech and/or image recognition data.

The input unit 960 may include a microphone, a camera, a scanner, a touch pad, a keyboard, a mouse, a mouse pen, or one or more of various sensors.

The ADC 970 may convert analog data inputted from the input unit 960 into digital data.

The neuromorphic unit 980 may perform learning or recognition using the data outputted from the ADC 970, and output data corresponding to recognized patterns. The neuromorphic unit 980 may include one or more of the neuromorphic devices in accordance with the various embodiments described above.

According to the present disclosure, an integrate-and-fire (LIF) post-synaptic neuron can be realized by using a variable resistor or a ferroelectric field effect transistor. Accordingly, the operations of the neuromorphic devices according to embodiments of the present disclosure can operate accurately, fast, and using a low power consumption.

Although various embodiments have been described for illustrative purposes, it will be apparent to those skilled in the art that various changes and modifications may be made without departing from the spirit and scope of the disclosure, as defined in the following claims.

What is claimed is:

1. A neuromorphic device comprising:
a pre-synaptic neuron;
a row line extending from the pre-synaptic neuron in a row direction;
a post-synaptic neuron;
a column line extending from the post-synaptic neuron in a column direction; and
a synapse at an intersection region between the row line and the column line,
wherein the synapse comprises a switching device and a memristor electrically connected with each other in series,
wherein the post-synaptic neuron comprises a summation circuit, a variable resistor, and a comparator,
wherein the switching device comprises a transistor,
wherein a gate electrode of the transistor is electrically connected with an output terminal of the comparator, and the transistor and the memristor are connected between the row line and the column line,
wherein the variable resistor comprises at least one of a resistive device, a phase changeable device, a magneto-resistive device, and a conductive bridging device, and
wherein the post-synaptic neuron further comprises a first feed-back line electrically connecting the output terminal of the comparator to the variable resistor.

2. The neuromorphic device of claim 1,
wherein the post-synaptic neuron further comprises an inverter on the first feed-back line.

3. The neuromorphic device of claim 1,
wherein the post-synaptic neuron further comprises a second feed-back line electrically connecting the output terminal of the comparator to the switching device.

4. The neuromorphic device of claim 3,
wherein the post-synaptic neuron further comprises an inverter on the second feed-back line.

5. The neuromorphic device of claim 1,
wherein the post-synaptic neuron further comprises a pulse generator electrically connected with the output terminal of the comparator.

6. The neuromorphic device of claim 5,
wherein the first feed-back line electrically connects an output terminal of the pulse generator to the variable resistor.

7. The neuromorphic device of claim 6,
wherein the second feed-back line electrically connects the output terminal of the pulse generator to the switching device.

8. The neuromorphic device of claim 1,
wherein the summation circuit comprises at least one of an adding circuit and an integrating circuit.

9. A neuromorphic device comprising:
a pre-synaptic neuron;
a row line extending from the pre-synaptic neuron in a row direction;
a post-synaptic neuron;
a column line extending from the post-synaptic neuron in a column direction; and
a synapse at an intersection region between the row line and the column line,
wherein the synapse comprises a switching device and a memristor electrically connected with each other in series,
wherein the post-synaptic neuron comprises a summation circuit, a variable resistor, and a comparator,
wherein the variable resistor comprises a ferroelectric field effect transistor (FeFET),
wherein the column line is electrically connected with an input terminal of the summation circuit,
wherein an output terminal of the summation circuit is directly and electrically connected with a gate electrode of the FeFET, and
wherein the post-synaptic neuron further comprises a first feed-back line electrically connecting an output terminal of the comparator to a body of the FeFET.

10. The neuromorphic device of claim 9,
wherein a source electrode of the FeFET is electrically connected with a power source, and
wherein a drain electrode of the FeFET is electrically connected with an input terminal of the comparator.

11. The neuromorphic device of claim 9,
wherein the post-synaptic neuron further comprises a pulse generator electrically connected with the output terminal of the comparator, and
wherein an output terminal of the pulse generator is electrically connected with the first feed-back line, the first feed-back line being electrically connected to the body of the FeFET.

12. A method for operating a neuromorphic device, the method comprising:
providing a row signal from a pre-synaptic neuron to a synapse through a row line;
generating a column signal in the synapse using the row signal;
providing the column signal from the synapse to a post-synaptic neuron through a column line, the post-synaptic neuron including a summation circuit electrically connected with the column line, a variable resistor having a first electrode directly and electrically connected with an output terminal of the summation circuit, and a comparator having an input terminal electrically connected with a second electrode of the variable resistor; and
providing a first portion of an output signal of the comparator to the variable resistor,
wherein the variable resistor comprises a ferroelectric field effect transistor (FeFET), wherein the first electrode of the variable resistor is a gate electrode of the FeFET, and wherein the method further comprises providing the first portion of the output signal of the comparator to a second electrode of the variable resistor.

13. The method of claim 12, further comprising:

providing a second portion of the output signal of the comparator to a switching device, the synapse including the switching device and a memristor.

14. The method of claim 13, wherein the switching device further comprises a transistor, and wherein the second portion of the output signal of the comparator is provided to a gate electrode of the transistor.

15. The method of claim 12, wherein the post-synaptic neuron further comprises a pulse generator having an input terminal electrically connected with an output terminal of the comparator, a portion of an output signal of the pulse generator being provided to the second electrode of the variable resistor.

* * * * *